Figure 1:
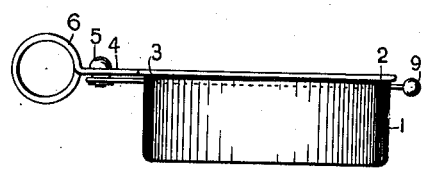

May 11, 1937.  A. MAFRA  2,080,210

DIETETIC METER FOR CHILDREN

Filed April 23, 1935

Patented May 11, 1937

2,080,210

UNITED STATES PATENT OFFICE 2,080,210

DIETETIC METER FOR CHILDREN

Agenor Mafra, Rio de Janeiro, Brazil

Application April 23, 1935, Serial No. 17,849
In Brazil May 8, 1934

1 Claim. (Cl. 73—62)

My invention relates to a dietetic meter for children and, more specially for babies, although it may be used advantageously in other ways.

It is well known that physicians, specially in the treatment of children, find it difficult to determine the exact amounts of basic substances to be used in diet or in a dietetic regimen, principally for very young children.

At present, the unit of measure adopted in determining the amounts, for children, of such foods as condensed or powdered milk, sugar, meal, rice cream and the like, is the "spoon". Thus, when predetermining the amount of food to be given a child, the current practice is to prescribe so many "tablespoonfuls" of, for instance, condensed milk, or so many "teaspoonfuls" of maizens, either scarce or overfull, to each sucking bottle. In short, the measure generally used at present, in feeding children is the "spoon".

Now, this measure is entirely arbitrary since it varies within wide limits. On the Brazilian market, for instance, at least sixteen different styles of table spoons are known, the same happening, surely, to the other types of spoons; and, of course, with such a variety of styles, it is clear that the holding capacity of the spoons will vary from one style to another. It was found, for example, that a table spoon of a certain style holds, when full, about three grams of powdered sugar, while a like spoon, of another style, was found to hold, when full, about six grams of the same sugar, or just double the weight held by the first spoon.

Under such conditions, it is easy to imagine that a great difference may exist between the "standard spoon" adopted by physicians and the spoon actually used by the child's mother in carrying out the prescription. In other words, the physician may prescribe the amounts, having in mind, for instance, a six gram spoon and the child's mother may make use of a three gram spoon, if the spoon she has at hand is of the latter capacity. To her, as to everybody, in general the expression "table spoon" as a unit of measure, has no fixed value. It may vary in size or capacity, without ceasing to be a "table spoon" all the same.

The harm that may come to children, due to such differences in the holding capacity of spoons, may be estimated, if it is considered that children are frail creatures, requiring the exercise of the greatest care in determining the amount of food given them. If the spoon used by the child's mother is of smaller capacity than of the "standard spoon" the prescribing physician had in mind, the child will be underfed, will have its growth impaired and may easily become a prey to a variety of diseases. If the opposite is the case, the child will be overfed, will suffer from diarrhea and may, likewise, become a prey to other diseases which will certainly end in death.

The present invention has for its object to do away with the above mentioned inconveniences. It will be then of great benefit to babies and even to more aged children, causing an appreciable reduction in their death rate. In short, my invention enables any practitioner, whether a specialist or not in children's diseases, to prescribe an exact rate of feeding, enabling, likewise, the child's mother to follow exactly the medical prescription, without the chance of error. In this way, the child will be able to grow normally, being fed in exact proportion to its increase in weight, free from any serious disturbances in its nutrition; and, in consequence, children's death rates will be greatly reduced.

Figure 2:
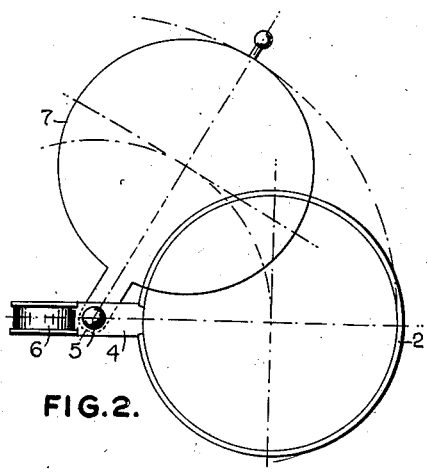

My invention is illustrated in the accompanying drawing, in which:

Figure 1 is a view, in elevation, of the dietetic meter embodying the invention, with the lid shut; and Fig. 2 is a plan view of same, showing the levelling lid open.

As shown, my dietetic meter consists essentially of a cylindrical box 1, preferably made of light metal, open at the top and having the rim 2 rounded out. Immediately under the rim 2 a slit 3 is provided which extends through the greater part of the circumference of the box.

An extension 4 projects at one side of the rim 2, being provided with a pin 5 and a ring 6. The lid 7 has an extension 8, by means of which it is pivoted to pin 5, so that it may gyrate and a projection 9, at a diametrically opposite point, serving to operate the lid in opening or closing the box 1.

My dietetic meter is used as follows:

Holding the box 1 in one hand, the operator causes the lid 7 to gyrate outwards, around pin 5, opening the box. The latter may then be filled with the food to be measured, sugar, for example, after which the lid 7 is brought back, to close the box.

As it slides in slit 3, being guided by the latter, the lid 7 acts as a leveller of the substance in the box, chasing out of it the substance in excess, which remains on the upper face of the lid.

In this way, if the physician prescribes 3 grams of a certain meal to each sucking bottle, all the mother's child has to do is to take a 3 gram capacity meter and proceed as just indicated.

From the above description, it is seen that the use of the dietetic meter of my invention does away with the all but too frequent errors, due to the difference in size of common spoons, eliminating entirely the risk of under or overfeeding, which has been heretofore the cause of a high children's death rate.

Having described my invention and how it may be carried out, I declare that what I claim and desire to secure by Letters Patent of the United States is:

A device of the character described comprising a container open at the top and provided with a horizontal slot extending at least halfway around and positioned near the top edge thereof, a handle member fixed to said container and including a shank extending laterally from the container with the under surface in substantial alignment with the upper edge of the slot, and a flat lid member pivotally mounted on the under surface of the shank of the handle and guided by the shank when moving through said slot to close the open top of said container.

AGENOR MAFRA.